UNITED STATES PATENT OFFICE.

SIMEON GOUSSEFF, OF ST. PETERSBURG, RUSSIA.

FIREPROOFING COMPOUND.

955,262.   Specification of Letters Patent.   Patented Apr. 19, 1910.

No Drawing.   Application filed March 7, 1908.   Serial No. 419,817.

*To all whom it may concern:*

Be it known that I, SIMEON GOUSSEFF, a citizens of the Russian Empire, residing at St. Petersburg, in the Russian Empire, have invented certain new and useful Improvements in Fireproofing Compounds; and I do hereby declare the following to be a full, clear, and exact description of the invention, such as will enable others skilled in the art to which it appertains to make and use the same.

This invention relates to a new and useful composition of a non-corrosive and fire-resisting liquid to be used as a paint in rendering wood and other combustible materials fire-resisting.

The composition is characterized by the combined use of aluminium sulfate and zinc chlorid as important and absolutely necessary constituents, to which are added talc, kaolin, linseed oil varnish, unskimmed milk or the like in the proportions hereinafter stated, which have been found most useful, in practice, but which may be varied within certain limits without materially affecting the result.

The proposed composition is prepared by mixing the following ingredients in about the proportions stated:

Aluminium sulfate, granulated_____ 13 parts by weight
Powdered talc_____ 1.50 " " "
Kaolin_____ 1.50 " " "
Unskimmed milk_____ 4 " " "

This mixture is well stirred, preferably in a clean tin vessel, and then allowed to stand from one to four hours, when it is again well stirred, after which it is rubbed down in a color grinding machine until a white pasty mass is formed. To this composition the following ingredients are added while being agitated, preferably in a zinc or wooden vessel: viz.

Chemically pure solution of zinc chlorid
 (50° Bé., which has previously been
 boiled and allowed to cool)_____ 20 parts by weight
Linseed oil varnish_____ 60 " " "

the whole totaling 100 parts. The agitation is energetically continued until the mass becomes an oily liquid that does not yield a solid deposit. Articles of wood or the like coated with this oily liquid, or with a paint made by rubbing up the oily liquid with a dry coloring matter, are rendered effectively fire-resisting to such an extent that they will not ignite until an extraordinary high temperature is reached and maintained for a long period, when the so treated articles carbonize slowly and without glowing. In practice the number of coats of paint employed varies according to circumstances.

I claim—

1. The herein-described composition of matter, consisting of aluminium sulfate, zinc chlorid, linseed oil varnish, powdered talc, kaolin and unskimmed milk, substantially as described and for the purpose specified.

2. The herein-described composition of matter for rendering wood and other combustible materials fire-resisting, consisting of granulated aluminium sulfate thirteen parts by weight, chemically pure boiled and dried zinc chlorid 50° Bé. twenty parts by weight, linseed oil varnish sixty parts by weight, powdered talc one and one-half parts by weight, kaolin one and one-half parts by weight and unskimmed milk four parts by weight.

In testimony that I claim the foregoing as my invention, I have signed my name in presence of two subscribing witnesses.

SIMEON GOUSSEFF.

Witnesses:
 W. STEININGER,
 H. A. LOVIAGEIME.